United States Patent [19]

Kouichi et al.

[11] Patent Number: 4,587,065
[45] Date of Patent: May 6, 1986

[54] METHOD FOR PRODUCING LIGHT TRANSMITTING ARTICLE OF SYNTHETIC RESIN

[75] Inventors: Maeda Kouichi, Takarazuka; Funaki Masaaki, Toyonaka; Yoshida Motoaki, Nishinomiya; Ohtsuka Yasuji, Suginami, all of Japan

[73] Assignee: Nippon Sheet Glass Co., Ltd., Japan

[21] Appl. No.: 626,697

[22] Filed: Jul. 2, 1984

[30] Foreign Application Priority Data

| Jul. 2, 1983 | [JP] | Japan | 58-120625 |
| Jul. 2, 1983 | [JP] | Japan | 58-120626 |
| Jul. 2, 1983 | [JP] | Japan | 58-120627 |
| Jul. 2, 1983 | [JP] | Japan | 58-120628 |
| Sep. 29, 1983 | [JP] | Japan | 58-181464 |
| Oct. 11, 1983 | [JP] | Japan | 58-189615 |
| Apr. 6, 1984 | [JP] | Japan | 59-68594 |

[51] Int. Cl.⁴ ............................................. G02B 6/00
[52] U.S. Cl. ..................................... 264/1.5; 264/1.6; 350/96.31; 427/163
[58] Field of Search ................. 264/1.5, 1.6, 1.7; 350/96.31, 413; 427/163

[56] References Cited

U.S. PATENT DOCUMENTS

| 3,718,383 | 2/1973 | Moore | 264/1.7 |
| 3,816,160 | 6/1974 | Moore | 350/413 |
| 3,930,103 | 12/1975 | Chimura et al. | 264/1.5 |
| 3,955,015 | 5/1976 | Ohtsuka et al. | 350/96.31 |

FOREIGN PATENT DOCUMENTS 16394  2/1976  Japan ................................. 350/413

Primary Examiner—James Lowe
Attorney, Agent, or Firm—McDougall, Hersh & Scott

[57] ABSTRACT

A method of producing a light transmitting article of synthetic resin by polymerizing incompletely a monomer Ma which forms a network polymer Pa having a refractive index Na, thereby forming a self-supporting body material, and subsequently diffusing a monomer Mb, which forms a polymer Pb having a refractive index Nb different from the refractive index Na, into said body material and simultaneously polymerizing said monomer Mb, wherein said method comprises steps of drawing out continuously a body material from a molding means in which said body material has been formed and is ready for the diffusion of the monomer Mb, and passing said body material through a diffusion means and a heating means one after the other, diffusing the monomer Mb into said body material by the aid of said diffusion means and then heating said body material by the aid of said heating means so that the distribution of said monomer Mb is fixed in said body material.

According to this invention, a light transmitting article of synthetic resin is produced continuously in good quality.

12 Claims, 10 Drawing Figures

FIG.3
FIG.4
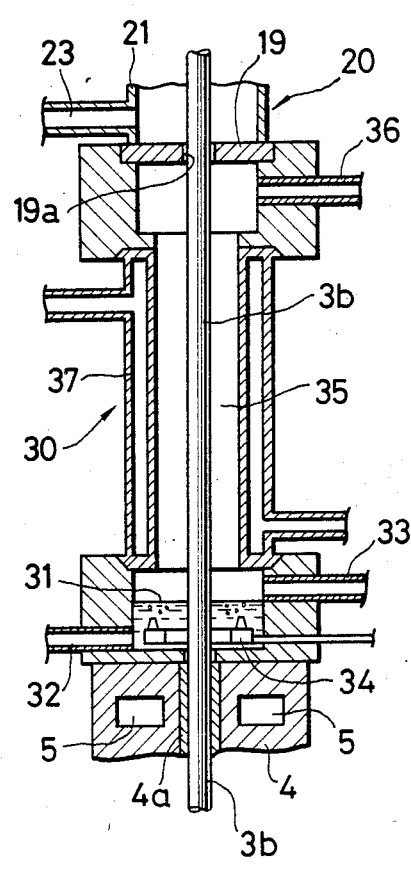
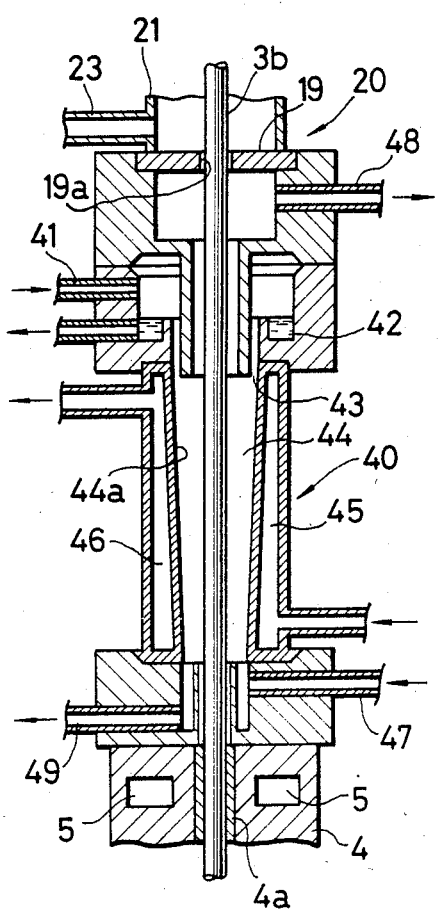

METHOD FOR PRODUCING LIGHT TRANSMITTING ARTICLE OF SYNTHETIC RESIN

BACKGROUND OF THE INVENTION

1. Field of the Invention

The present invention relates to a method and apparatus for producing a light transmitting article of synthetic resin which has a gradient refractive index.

2. Description of the Prior Art

Among light transmitting articles, there is known a transparent rod having a refractive index which gradually decreases in proportion with the square of the distance from the axis. Such a rod works like a convex lens, and the distribution of the refractive index in it may be approximated by the equation (1).

$$n(r) = n_0(1 - \tfrac{1}{2}Ar^2) \quad (1)$$

wherein n(r) is the refractive index at a point of distance r from the axis; $n_o$ is the refractive index at the axis; and A is a positive constant.

Light entering one end of the rod is transmitted to the other end sinusoidally with a period of L which is approximated by the equation (2). L is called the pitch.

$$L = 2\pi/\sqrt{A} \quad (2)$$

On the other hand, a transparent rod having a refractive index which gradually increases in proportion with the square of the distance from the axis as approximated by the equation (3) works like a concave lens.

$$n(r) = n_0(1 + \tfrac{1}{2}Br^2) \quad (3)$$

wherein n(r) and $n_o$ are defined as above, and B is a positive constant.

The method for producing a light transmitting article of syntheic resin having a gradient refractive index as mentioned above is disclosed in Japanese Patent Publication No. 5857/1977 and Japanese Patent Laid-open Nos. 16394/1976 and 119939/1979. According to the method disclosed in the first two patents, a liquid monomer Ma capable of forming a network polymer Pa through crosslinking is subjected to initial polymerization to form a transparent body material in the form of gel. The body material is then steeped in another liquid monomer Mb which forms a polymer Pb having a refractive index different from that of the network polymer Pa, so that the monomer diffuses into the body material in such a way that the monomer concentration in the body material gradually decreases toward the inside. The polymerization of the monomer Mb is accomplished simultaneously with diffusion and/or during the heat treatment performed after diffusion. In this step, the polymerization of the monomer Ma is also brought to completion.

The above-mentioned method, however, has some disadvantages resulting from the steeping of the body material in the liquid monomer Mb. In the case where the diffusion and polymerization of the monomer Mb are performed simultaneously, the liquid monomer Mb becomes viscous due to polymerization taking place slowly in the liquid phase because the steeping temperature is kept comparatively high and the polymerization initiator contained in the body material dissolves in the monomer Mb with the lapse of steeping time. The viscous substance thus formed sticks to the surface of the body material when the body material is removed from the liquid monomer after the diffusion process. In the heat treatment process, the body material absorbs the monomer Mb from the viscous substance it carries. This adversely affects the refractive index at the peripheral part of the light transmitting article. This drawback may be overcome by adding a polymerization inhibitor to the monomer Mb so that it does not polymerize in the liquid phase. But this causes another trouble. That is, the polymerization inhibitor diffuses into the body material together with the monomer Mb and it prevents the complete polymerization in the heat treatment process.

In the case where the polymerization is performed after the diffusion of the monomer Mb is complete, the steeping is carried out at a comparatively low temperature but the monomer Mb which has diffused into the body material vaporizes during the heat treatment process. This again adversely affects the refractive index at the peripheral part of the light transmitting article.

The method disclosed in the above-mentioned Japanese Patent Laid-open No. 119939/1979 was developed to improve the above-mentioned methods, thereby avoiding the distorted distribution of the refractive index in the vicinity of the peripheral part. According to this method, the diffusion of the monomer Mb is performed in the gas phase. In other words, the body material is placed in the vapor of the monomer Mb for a prescribed period of time so that the monomer Mb diffuses into the body material. Simultaneously with the diffusion, the monomer Mb is partly polymerized, and it is completely polymerized by subsequent heat treatment. This method has the following advantages.

(1) The monomer Mb does not stick unnecessarily to the surface of the body material. Therefore, the additional diffusion of the monomer Mb into the body material does not take place during the heat treatment. Since the diffusion is performed at a high temperature, the monomer Mb polymerizes and becomes immobilized while it diffuses into the body material. Thus the monomer Mb does not vaporize from the body material during the heat treatment. This leads to the production of a light transmitting article in which the distortion of refractive index at the peripheral part is minimal and the initial distribution of refractive index is broad.

(2) The polymerization of the monomer Mb in the liquid phase can be prevented by adding a polymerization inhibitor to the liquid monomer Mb from which the vapor of the monomer Mb is supplied. If the inhibitor is one which has a low vapor pressure and vaporizes very little, it will not diffuse into the body material; and therefore, the polymerization will not be inhibited in the heat treatment process. Moreover, if the feed rate of the monomer Mb is properly adjusted, it would not be necessary to add any polymerization inhibitor. This permits the monomer Mb to be recycled repeatedly with a high rate of recovery.

In spite of these advantages, the vapor phase diffusion method still has the following drawbacks. The concentration of the monomer Mb in the gas phase depends on the vapor pressure at a given temperature of the gas phase, and the monomers having a high vapor pressure for efficient diffusion are limited in kind. For example, 1,1,3-trihydroperfluoropropyl (monomer Mb) cannot be used for diffusion into a thick body material (4 mm or more in diameter) by the vapor phase diffusion method as disclosed in Japanese Patent Laid-open No. 119939/1979 because of its low vapor pressure, although it can be used in combination with diethylene glycol bisallyl carbonate (monomer Ma) for producing a light transmitting article of synthetic resin having low chromatic aberration according to the method disclosed in Japanese Patent Laid-open No. 16394/1976.

The conventional method was poor in productivity because the process for producing the body material, the process for diffusing the monomer Mb, and the process of heat treatment are all carried out batchwise. The batchwise operation has the following drawback. The composition of the body material fluctuates in the lengthwise direction either when there is a slight variation in temperature and monomer concentration in the apparatus into which the vaporized or atomized monomer Mb is introduced for diffusion into the body material, or when there is a slight variation in temperature distribution in the heat treatment apparatus. The fluctuation of the composition of the body material in lengthwise direction results in a light transmitting article which is not uniform in optical performance along its length. For the reasons mentioned above, the conventional method was unable to efficiently provide light transmitting articles of uniform quality.

SUMMARY OF THE INVENTION

It is an object of this invention to provide a method and apparatus for producing continuously and efficiently a light transmitting article of synthetic resin.

It is another object of this invention to provide a method and apparatus for producing a light transmitting article of synthetic resin which has a uniform quality along its length.

The objects of this invention can be achieved by a method of producing a light transmitting article of synthetic resin by polymerizing incompletely a monomer Ma which forms a network polymer Pa having a refractive index Na, thus forming a self-supporting body material, and subsequently diffusing a monomer Mb, which forms a polymer Pb having a refractive index Nb different from the refractive index Na, into said body material and simultaneously polymerizing said monomer Mb, wherein the improvement comprises drawing out continuously a body material from a molding means in which said body material has been formed and is ready for the diffusion of the monomer Mb, and passing said body material through a diffusion means and a heating means one after the other, whereby the monomer Mb is diffused into said body material by the aid of said diffusion means and then heating said body material by the aid of said heating means so that the distribution of said monomer Mb is fixed in said body material.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIG. 3 is an enlarged sectional view of the diffuser unit in the apparatus used in the second embodiment of this invention.

FIG. 4 is an enlarged sectional view of the diffuser unit in the apparatus used in the third embodiment of this invention.

DETAILED DESCRIPTION OF THE INVENTION

The first embodiment of this invention is described with reference to FIGS. 1 and 2.

Figure 1:
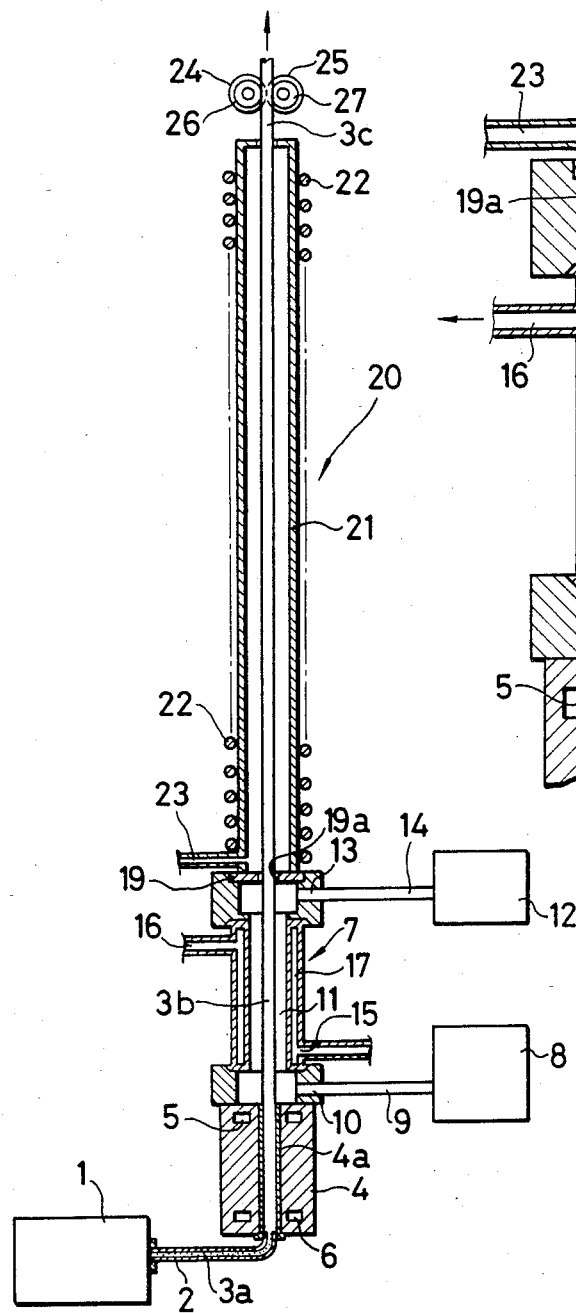
FIG. 1 is a schematic longitudinal sectional view of the apparatus for producing a light transmitting article of synthetic resin according to the first embodiment of this invention.

Referring to FIG. 1, there is shown an extruder (1) which is cooled by cooling water. The extruder holds a viscous fluid (prepolymer) which is the raw material of a light transmitting article of synthetic resin. The prepolymer fluid is prepared by precuring the monomer Ma, which forms a network polymer Pa having a refractive index Na, to such an extent that gelation is about to take place, and it is kept fluid in the extruder. The extruder (1) is provided with a plunger (shown at reference numeral 141 in FIG. 9) which extrudes the prepolymer (3a) into a molding tube (4a) through a connecting pipe (2).

The prepolymer (3a) should preferably be one which exhibits the plastic flow defined by the equation of the non-Newtonian fluid (Ostwald's law of power):

$$D = K\sigma^n \qquad (4)$$

wherein D is the shear rate, $\sigma$ is the shear stress, K is the reciprocal of plastic viscosity, and n is a constant greater than 1.10 at 20° C. The reason for this is described below.

When a fluid like a monomer or low-viscosity prepolymer thereof which can be approximated by a Newtonian fluid is passed through a thin tube and polymerized with heating during its passage, the polymerization starts at the outside of the tube and propagates toward the inside of the tube because the heating is applied to the outside of the tube. As the polymerization proceeds, the viscosity of the fluid increases. This enhances the rate of shear, and the difference between the flow velocity at the center of the tube and that at the peripheral part of the tube becomes great as the polymerization proceeds. Finally, the fluid near the tube wall gels and stays in the tube, whereas the fluid near the center of the tube continues to flow.

In order to avoid this undesirable flow pattern, it is necessary to make even the distribution of the flow velocity in the tube. This is accomplished by approximating the fluid in the tube to a Bingham body. A Bingham body is defined by the equation (4) in which $n = \infty$, and the flow velocity of a Bingham body in the tube is constant. As n approaches 1, the fluid behaves like a Newtonian fluid. The flow velocity of the fluid near the inside wall of the tube is not greatly affected by the value of n. It is high when the value of n is great; but the flow velocity at the center increases as the value of n approaches 1. As the result, the flow velocity at the periphery greatly differs from that at the center, and the shear stress of the fluid in the tube becomes sharper.

For the reasons mentioned above, the monomer Ma to be fed to the molding tube (4a) should be preliminarily polymerized into a viscous fluid having the value of n greater than 1.10. If the value of n is less than 1.10, the monomer Ma at the center passes through the tube (4a) without being polymerized once the gelation of the monomer Ma takes place at the periphery. This leads to the formation of a poor body material. In the case of a monomer having the value of n less than 1.10, it may be possible to produce a body material if the flow velocity is extremely lowered; but this is not practical because of poor productivity. The value of n should not exceed 1.50. When the value of n is excessively great, it would be difficult to force the monomer into the tube (4a) and the resulting body material becomes uneven.

Incidentally, the values of K and n in the above equation (4) can be obtained from a graph in which are plotted the values of $\sigma$ measured at the varied values of D with a rotational viscometer.

The prepolymer (3a) which has been extruded from the extruder (1) is then introduced continuously into the molding tube (4a) made of teflon which passes through the cylindrical heating molder (4) made of brass. This teflon tube (4a) has a circular section, 1 to 20 mm in diameter. At the start-up of production, a stainless steel tube (not shown) is inserted into the teflon tube (4a) from above so that the extruded prepolymer (3a) gels in contact with the lower end of the stainless steel tube. The stainless steel tube is pulled up by the take-up unit, which is mentioned later, at the same speed as the extrusion speed so that the prepolymer passes through the entire process smoothly.

The heating molder (4) has the passageway (5) for hot water of comparatively high temperature and the passageway (6) for hot water of comparatively low temperature. It heats the teflon tube (4a) with an upward temperature gradient. While passing through the teflon tube (4a), the prepolymer (3a) undergoes heat polymerization and gelation. The gel formed from the prepolymer becomes the body material (3b). The heating for heat polymerization should preferably be carried out at a rate of 0.1 to 1.0° C./minute.

The heating molder (4) is given the temperature gradient so that the prepolymer (3a) introduced into the teflon tube (4a) from the pipe (2) is gradually heated and polymerized as it moves upward through the teflon tube (4a), and emerges in the form of transparent gelled product (3b) from the upper end of the molder (4). If this temperature gradient does not exist, the prepolymer (3a) is suddenly heated as it enters the heating molder (4), with the result that the viscosity of the prepolymer decreases extremely. The temperature gradient is necessary for the continuous production of the uniform body material (3a). The temperature gradient brings about gelation while keeping the prepolymer (3a) close to a Bingham body. Owing to the temperature gradient, the heating molder (4) carries out the polymerization of the prepolymer without abruptly decreasing the viscosity of the prepolymer. This contributes to the production of the body material (3a) which is uniform along the radial direction. The teflon tube (4a) helps the body material (3b) to be discharged smoothly from the heating molder (4) on account of its low friction with the prepolymer (3a) and the body material (3b). The teflon tube (4a) may be replaced by a plastic or metal tube.

The gelled body material (3b) emerging from the teflon tube (4a) held by the heating molder (4) has almost no fluidity and is self-supporting. This body material (3b) contains 5 to 90 wt%, preferably 10 to 50 wt%, of acetone-insoluble component of network polymer. If the content of this component is too low, the resulting body material is excessively fluid; and in the opposite case, the diffusion of the monomer Mb is excessively slow in the subsequent diffusion process.

The body material (3b) is then delivered to the diffusion unit (7).

Figure 2:
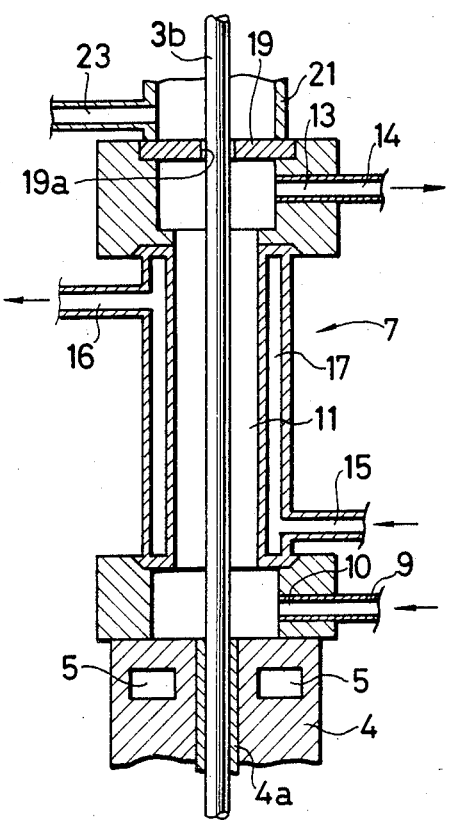
FIG. 2 is an enlarged sectional view of the diffuser unit in the apparatus of FIG. 1.

The detailed structure of the diffusion unit (7) is shown in FIG. 2. The monomer Mb, which has been atomized by ultrasonic or spraying in the atomizer (8), is introduced into the gas phase diffusion chamber (11) through the pipe (9) and the inlet (10). The atomized monomer Mb introduced into the gas phase diffusion chamber (11) is discharged for recovery through the outlet (13) and the pipe (14) connected to the vacuum pump (12). The gas phase diffusion chamber (11) is kept at a prescribed temperature by the jacket through which hot water (17) passes from the inlet (15) to the outlet (16). To the upper part of the diffusion unit (7) is attached the disk (19) having at its center the hole (19a) a little larger than the diameter of the body material (3b). The disk (19) prevents the monomer Mb from entering the heat-treating tube (20) (mentioned later) from the gas phase diffusion chamber (11).

The body material (3b) in the gas phase diffusion chamber (11) is in the state of incomplete polymerization, and consequently the monomer Mb can diffuse into the body material through the surface thereof. The amount of the monomer Mb that diffuses into the body material (3b) depends on the time of contact. During the diffusion, the body material (3b) partly undergoes polymerization. The atomized monomer Mb partly or entirely vaporizes depending on the boiling point of the monomer Mb and the temperature of the gas phase diffusion chamber (11). This is quite all right.

It is important that the atmosphere of the gas phase diffusion chamber (11) be replaced with nitrogen and a flow of the atomized monomer Mb be formed in the gas phase diffusion chamber (11). In practice, nitrogen containing the atomized monomer Mb is introduced into the inlet (10) of the gas phase diffusion chamber (11). Nitrogen as a carrier gas may be replaced by an inert gas such as argon and helium.

The time and temperature for the residence of the body material (3b) in the atmosphere containing the atomized monomer Mb depend on the desired gradient of refractive index. If the time is excessively long and the temperature is excessively high, the monomer Mb diffuses into the body material (3b) uniformly in the radial direction, and the desired gradient of refractive index cannot be obtained. The contact time should be just long enough or a little longer than enough to permit the diffusion of the monomer Mb to reach the center of the body material (3b). The body material (3b) thus formed will, after heat treatment, have the refractive index which increases or decreases in the radial direction in proportion with the square of the distance from the center, or the distribution of refractive index as defined by the above-mentioned equations (1) or (3). Thus it has the function of a convex lens or a concave lens.

After heat polymerization in the gas phase diffusion chamber (11), the body material (3b) is introduced into the heat-treating tube (20), with the atmosphere replaced with nitrogen, in which the heat polymerization is brought to completion. The heat-treating tube (20) is made up of the metal tube (21) and the electric heater (22) arranged on the external surface thereof. The inside of the heat-treating tube (20) is kept at a prescribed temperature by the heater (22). The heating of the heat-treating tube (20) may be accomplished by microwave heating instead of the electric heater (22). In this case, the body material (3b) is heated externally as well as internally. The heat-treating tube (20) is provided at its bottom with the nitrogen inlet (23) through which nitrogen is admitted into the heat-treating tube (20).

The polymerization of the body material (3b) is brought to completion in the heat-treating tube (20). The heater (22) may be set so that there is a temperature gradient (increasing upward) in the heat-treating tube (20).

Upon completion of heat-treatment, the body material (3b) becomes the light transmitting article of synthetic resin (3c), which is then pulled up by the pulleys (26) and (27) directly driven by the motors (24) and (25), respectively.

When the apparatus is in operation, the extruder (1) is run so as to feed the prepolymer (3a) to the tube (4a) at a fixed flow rate and the motors (24) and (25) are run so as to pull up the light transmitting article (3c) at a constant speed.

The light transmitting article (3c) thus obtained has a gradient refractive index which continuously increases or decreases in the radial direction in proportion with the square of the distance from the axis. The gradient refractive index is established according to the combination of the monomer Ma and the monomer Mb. The refractive index is kept constant along the length of the light transmitting article (3c).

According to this embodiment of the invention, the atomized monomer Mb is brought into contact with the body material (3b) for diffusion; therefore, the diffusion process is not restricted by the vapor pressure of the monomer Mb. Thus this method makes it possible to use any monomer Mb having a vapor pressure lower than 1 mmHg which cannot be used according to the conventional method. Moreover, this method permits the continuous production of the light transmitting article of uniform quality.

In this embodiment of the invention, the prepolymer (3a) is formed into the body material (3b) which is a transparent gel object, by the heating molder (4). The body material (3a) is then introduced into the gas phase diffusion chamber (11), in which the monomer Mb is diffused into the body material (3b). The body material (3b) is finally heated in the heat-treating tube (20) to be converted into the light transmitting article of synthetic resin (3c). As the processes are performed continuously, this method is free of the following disadvantages encountered in the conventional production in which the preparation of the body material (3b), the diffusion of the monomer Mb, and the heat treatment are carried out batchwise. In batchwise operation, the composition of the transparent gel object will vary in the lengthwise direction even when the slightest fluctuation takes place in the temperature of the diffuser unit or the heat-treating unit or in the concentration of the monomer Mb in the diffuser unit in which the atomized monomer Mb introduced thereinto is diffused into the body material. The variation of the composition leads to the lengthwise variation of the optical properties of the resulting light transmitting article of synthetic resin.

According to the above-mentioned first embodiment of this invention, the atomized monomer Mb is brought into contact with the body material (3b) for diffusion. Alternatively, it is also possible to perform diffusion by using the vapor of the monomer Mb generated by a proper vaporizer. In this case, the vapor of the monomer Mb is introduced into the gas phase diffusion chamber (11) together with nitrogen or other inert carrier gas. (The carrier gas should be free of oxygen which inhibits polymerization.) The temperature of the vapor of the monomer Mb should be kept such that the vapor pressure of the monomer Mb is high enough for diffusion. It is, for example, 5° to 90° C. The higher the temperature, the greater the diffusion rate of the monomer Mb. An excessively high temperature is not preferable because the polymerization rate of the body material increases with temperature. The diffusion time and diffusion temperature depend on the desired gradient of refractive index of the light transmitting article, or the gradient of the concentration of the monomer Mb. If the diffusion time is excessively long, or if the diffusion temperature is excessively high, the gradient of the concentration of the monomer Mb will be flat or the concentration will be partially high at the periphery of the body material. In either case, the gradient of refractive index is not obtained as desired.

The gas phase diffusion method employed in the embodiment illustrated in FIG. 1 may be replaced by the liquid phase diffusion method. Where the gas phase diffusion method is employed, the pressure in the diffusion unit may be kept lower than the normal pressrue in order to help form an atmosphere containing the vapor of the monomer Mb. Diffusion at normal pressure is possible to perform where the monomer Mb has a comparatively low boiling point.

The second embodiment of this invention, which is identical with the first one except the diffusion unit, is described with reference to FIG. 3.

According to this embodiment, the diffusion unit (30) is made up of the lower liquid phase diffusion chamber (31) and the upper gas phase diffusion chamber (35). To the liquid phase diffusion chamber (31) is fed the liquid monomer Mb through the inlet (32). An excess of the monomer Mb is discharged from the outlet (33). The monomer Mb introduced into the liquid phase diffusion chamber (31) diffuses into the body material (3b) in such a manner that a gradient of concentration is established in the body material (3b) or the concentration of the monomer Mb in the body material increases in the radial direction in proportion with the square of the distance from the axis of the body material. In the liquid phase diffusion chamber (31) is arranged the bubbler (34), which is immersed in the monomer Mb. The bubbler (34) generates nitrogen bubbles to vaporize the monomer Mb. The vapor or mist of the monomer Mb thus generated ascends to the adjacent gas phase diffusion chamber (35) and fills it. The monomer Mb is finally discharged for recovery from the outlet (36) connected to the vacuum pump (12). (See FIG. 1) Before operation, the atmosphere of the liquid phase diffusion chamber (31) is replaced with nitrogen to prevent polymerization from being inhibited by oxygen.

The body material (3b) which has undergone the diffusion of the liquid monomer Mb enters the gas phase diffusion chamber (35) filled with the atmosphere containing the vapor of the monomer Mb. The gas phase diffusion chamber (35) is heated by hot water flowing through the jacket (37) surrounding it. While the body material (3b) passes through the gas phase diffusion chamber (35), the monomer Mb which has diffused into the body material (3b) polymerizes alone and/or with the monomer Ma and prepolymer which remain unpolymerized in the body material. As a result, the gradient of concentration of the monomer Mb is established as desired in the body material (3b). Since this process is carried out with the body material (3b) surrounded by the atmosphere containing the vapor of the monomer Mb, the monomer Mb which has diffused into the body material does not vaporize. This prevents the distortion of the refractive index in the vicinity of the periphery. The concentration of the monomer Mb in the gas phase should be higher than 20% of the saturated concentration. This concentration (vapor pressure) will balance with or exceed the concentration (vapor pressure) of the monomer Mb which has diffused into the periphery of the body material (3b). If the concentration of the monomer Mb in the gas phase is higher than that in the periphery of the body material, the monomer Mb in the gas phase will diffuse into the body material in the heating process.

The temperature of the monomer Mb in the liquid phase diffusion chamber (31) should be 5° to 90° C. so that the monomer Mb is vaporized and the vapor pressure of the monomer Mb is kept high enough for diffusion into the body material. The higher the temperature, the higher the diffusion rate of the monomer Mb. The excessively high temperature, however, increases the polymerization rate of the body material and polymerizes the monomer Mb in the liquid phase, increasing the viscosity. The residence time (or the diffusion time) and the diffusion temperature for the body material in the diffusion chamber (30) are established according to the gradient of refractive index in the light transmitting article or the gradient of concentration of the monomer Mb in the body material. If the diffusion time is excessively long or if the diffusion temperature is excessively high, the gradient of concentration of the monomer Mb becomes flat throughout the body material or becomes steep in the periphery of the body material. Thus the gradient of refractive index is not obtained as desired.

In this embodiment, the atmosphere in the gas phase diffusion chamber (35) is formed from the monomer Mb in the liquid phase diffusion chamber (31). In other words, the monomer Mc in the form of gas or mist in the gas phase diffusion chamber is the same as the monomer Mb in the form of liquid. The monomer Mc may be a substance different from the monomer Mb, or a mixture containing the monomer Mb and other monomer. In the case where the monomer Mc in the form of gas or mist, which is different from the monomer Mb, is contained in the gas phase, the gas phase diffusion chamber (35) and the liquid phase diffusion chamber (31) are partitioned. In this case, the monomer Mb in the liquid phase diffusion chamber (31) is used only for liquid phase diffusion without bubbling, and monomer Mc in the form of gas or vapor is fed to the gas phase diffusion chamber (35) from the vaporizer. An alteration is possible in which gas phase diffusion chamber is filled with the vapor of the monomer Mb as mentioned above and, at the same time, the vapor of the monomer Mc is introduced into the gas phase diffusion chamber, so that the gas phase diffusion chamber contains a mixture of the monomers Mb and Mc. In this case, the monomer Mc may be a substance which is a gas at normal temperature. In any way, the combination of the monomers Ma, Mb, and Mc should be selected so that the respective homopolymers Pb and Pc of the monomers Mb and Mc have greater or smaller refractive indexes than that of the homopolymer of the monomer Ma.

After heat polymerization in the gas phase diffusion chamber (35), the body material (3b) is introduced into the nitrogen-replaced heat-treating tube (20) in which heat polymerization is brought to completion. In this case, it is also possible that the vapor of the monomer Mb is introduced into the heat-treating tube (20).

This embodiment has the following advantages. That is, the monomer Mb which accounts for a large portion of the monomer to be diffused into the body material is not limited to ones having a high vapor pressure. Moreover, since the function of the vapor of the monomer Mc is to suppress the evaporation of the monomer Mb from the body material, the monomer Mc does not necessarily have to have a high vapor pressure. Finally, since the heat treatment of the body material is accomplished in the atmosphere containing the vapor (or mist) of the monomer Mc (or the monomer Mb), it is possible to prevent the distribution of refractive index from distorting at the periphery of the body material (3b).

Figure 5:
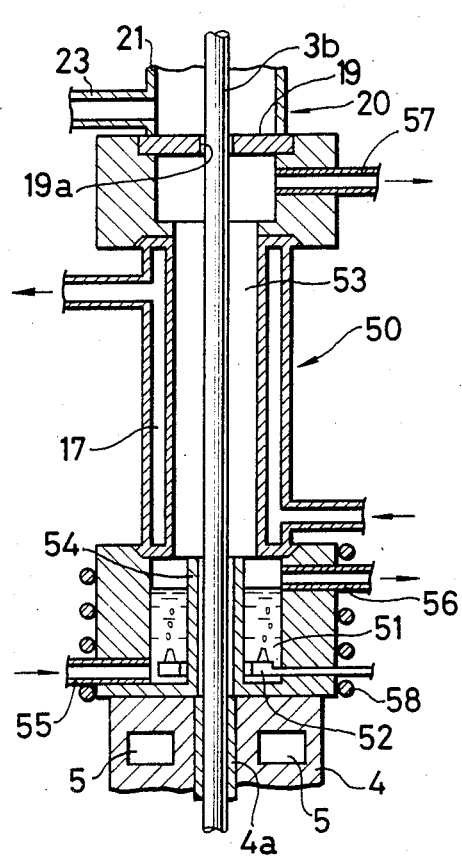
FIG. 5 is an enlarged sectional view of the diffuser unit in the apparatus used in the fourth embodiment of this invention.

The third and fourth embodiments of this invention are illustrated in FIG. 4 and FIG. 5, respectively. In the diffusion unit (40) shown in FIG. 4, the liquid monomer Mb is supplied to the upper inlet (41) and is stored in the monomer reservoir (42). The overflow from the reservoir flows down through the gap (43) and then along the inside wall (44a) of the gas phase diffusion chamber (44). Since the inside wall (44a) is heated by hot water (46) passing through the jacket (45), the monomer Mb flowing along it is vaporized. The vapor of the monomer Mb is discharged for recovery through the outlet (48), together with nitrogen introduced from the inlet (47). The monomer Mb which has flowed down without being evaporated is recovered through the outlet (49).

In the diffusion unit (50) shown in FIG. 5, the liquid monomer Mb is introduced to the monomer reservoir (51) at the bottom of the diffusion unit (50), and is vaporized by nitrogen bubbles generated by the bubbler (52), so that the gas phase diffusion chamber (53) is filled with the vapor of the monomer Mb. Nitrogen for bubbling may be replaced by argon, helium, or other inert gas. The monomer reservoir (51) is separated from the body material (3b) by the internal wall (54). In other words, unlike the second embodiment, the body material does not come into contact with the liquid monomer Mb. The liquid monomer Mb is supplied to the monomer reservoir (51) through the inlet (55), and an excess of the monomer Mb is discharged for recovery from the outlet (56). The vapor of the monomer Mb is discharged for recovery through the outlet (57) connected to the vacuum pump. The monomer reservoir (51) may be heated by the heater (58).

In the embodiments as shown in FIGS. 4 and 5, the gas phase diffusion is carried out at normal pressure. Since the body material (3b) comes into contact with the monomer Mb in the form of gas, it is not necessary to add a polymerization inihibitor to the monomer Mb. Thus the monomer Mb can be recycled repeatedly and recovered at a high rate.

Figure 6:
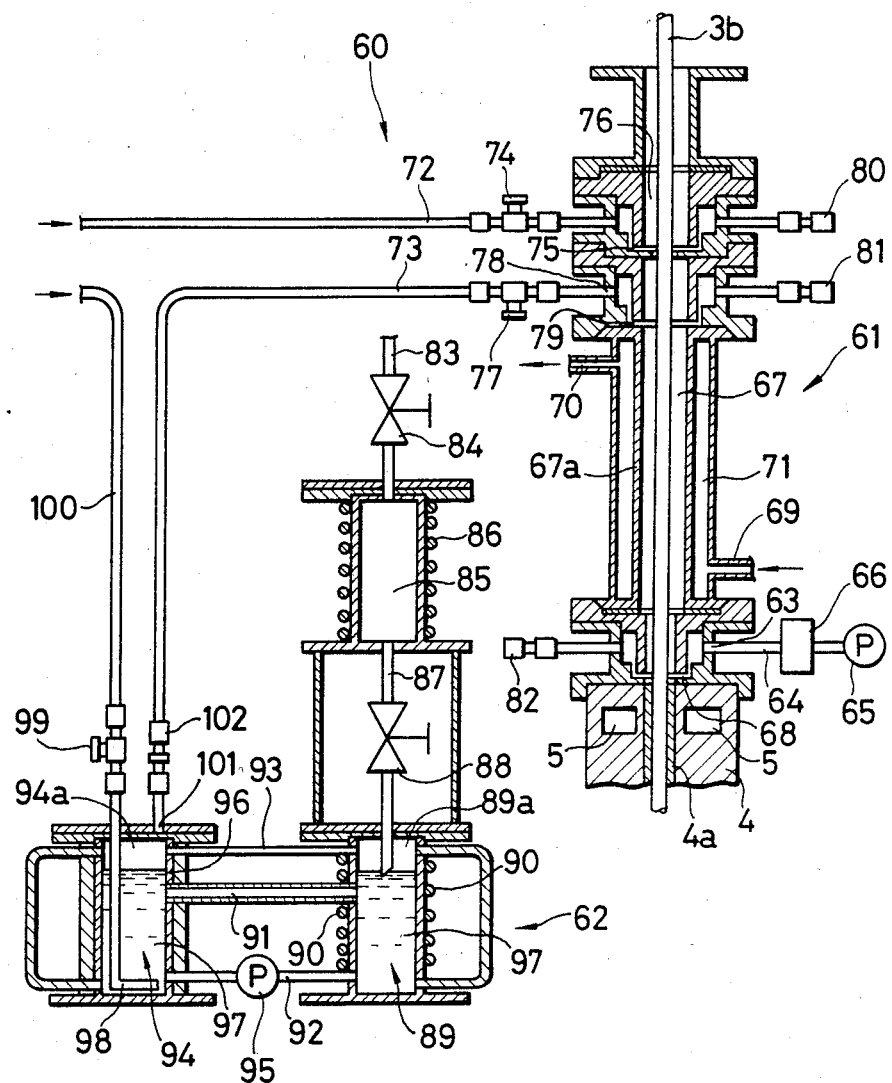
FIG. 6 is an enlarged sectional view of the diffuser unit in the apparatus used in the fifth embodiment of this invention.

The fifth embodiment of this invention is described with reference to FIG. 6. The diffusion apparatus (60) in this embodiment consists of the diffusion unit (61) and the monomer gas generator (62). The diffusion unit (61) is provided at the bottom with the outlet (63) which is connected to the vacuum pump (65) through the exhaust pipe (64) and the cold trap (66). The gas phase diffusion chamber (67) is evacuated by the vacuum pump (65) through the exhaust pipe (64) and the gap (68). The diffusion chamber (67) is heated at a prescribed temperature by the jacket through which hot water (71) passes from the inlet (69) to the outlet (70).

The upper part of the diffusion unit are connected to the pipes (72) and (73). When the valve (74) on the pipe (72) is open, nitrogen is introduced into the upper chamber (76) of the diffusion unit (61) through the pipe (72) and the gap (75). The nitrogen introduced into the upper chamber (76) of the diffusion unit (61) keeps the gas phase diffusion chamber (67) from oxygen. When the valve (77) on the pipe (73) is open, the vapor of the monomer is introduced into the diffusion chamber (67) through the inlet (78) and the gap (79). The thermometers (80), (81), and (82) are provided to measure the temperature at each section in the diffusion unit.

The monomer gas generator (62) is provided with the feed pipe (83) to supply the monomer Mb. When the valve (84) on the feed pipe (83) is open, the monomer Mb is supplied to the reservoir (85), which is cooled, for example at 10° C., by cooling water passing through the cooling pipe (86) arranged outside the reservoir (85). The monomer Mb is then introduced to the storage vessel (89) when the valve (88) on the pipe (87) is open. The storage vessel (89) is cooled, for example at 10° C., by cooling water passing through the cooling pipe (90) arranged outside thereof.

The storage vessel (89) is connected to the second storage vessel (94) through the pipes (91), (92), and (93). The pipe (92) is provided with the pump (95) which returns the monomer Mb from the second storage vessel (94) to the first storage vessel (89). The second storage vessel (94) is heated to 30° to 100° C. by the heater arranged on the outside thereof. In the case where 2—2—2 trifluoroethyl methacrylate (3FMA) is used as the monomer Mb, the second storage vessel (94) is heated to 70° to 80° C. In the second storage vessel (94) is installed the bubbler (98) from which bubbles of an inert gas (e.g., nitrogen) are generated. The inert gas is supplied through the pipe (100) and the valve (99). The vapor of the monomer Mb generated by the bubbler in the second storage vessel (94) is introduced into the different diffusion chamber (67) of the diffusion unit (61) through the pipes (101) and (73). The pipe (73) is provided with the flowmeter (102) to measure the flow rate of the vapor of the monomer Mb.

The following is the method for diffusing the monomer Mb into the body material (3b) by using the diffusion apparatus (60) mentioned above with reference to FIG. 6. A prescribed amount of liquor monomer Mb is filled into the reservoir (85) through the feed pipe (83), with the valve (84) open and the valve (88) closed. The valve (84) is then closed. The liquid monomer Mb in the reservoir (85) is cooled to about 10° C. The valve (88) is opened to transfer the liquid monomer Mb to the first storage vessel (89) through the pipe (87). As the level of the liquid monomer Mb rises to the pipe (91), the liquid monomer begins to flow into the second storage vessel (94) through the pipe (91). After a while, the levels of the liquid monomer Mb in the first and second storage vessels (89) and (94) are balanced. The valve (88) is half closed so that the liquid monomer Mb falls dropwise from the end of the pipe (87). Incidentally, the first and second storage vessels (89) and (94) are previously kept at about 10° C. and 80° C., respectively.

As the pump (95) is set to working, the liquid monomer Mb in the second storage vessel (94) is returned to the first storage vessel (94) through the pipe (92). The operation of the pump (95) lowers the level of the monomer Mb in the second storage vessel (94) and raises the level of the liquid monomer Mb in the first storage vessel (89). But the difference of the levels becomes even soon because a part of the liquid monomer Mb in the first storage vessel flows into the second storage vessel (94) through the pipe (91). In an equilibrated state, the liquid monomer is fed dropwise from the end of the pipe (87) while the liquid monomer Mb is circulated between the storage vessels (89) and (94), with the levels in them almost balanced. The pipe (93) connecting the first and second storage vessels (89) and (94) with each other at their upper parts equalizes the pressures of the spaces (89a) and (94a) in the first and second storage vessels (89) and (94), respectively. This helps balance the levels of the liquid monomer Mb in the two storage vessels (89) and (94). The circulation prevents the liquid monomer Mb from polymerizing in the second storage vessel (94) which is heated to about 80° C. The quantity of the monomer Mb to be fed dropwise from the end of the pipe (87) should be just enough to replenish the monomer Mb consumed by evaporation in the second storage vessel (94). In practice, the feed is adjusted automatically by selecting the pipe (87) of proper diameter. As the level of the liquid monomer Mb in the first storage vessel (89) lowers and the forward end of the pipe (87) gets clear of the liquid monomer Mb, air enters the forward end of the pipe (87), permitting a certain amount of the liquid monomer Mb to be discharged automatically from the forward end of the pipe (87).

When the level height and temperature of the liquid monomer Mb become stable in the first and second storage vessels (89) and (94), the valve (99) is opened and nitrogen is introduced to the bubbler (98) through the pipe (100). Thus the liquid monomer Mb is vaporized and the second storage vessel (94) is filled with a mixture gas of the vapor of the monomer Mb and nitrogen. This mixture gas is introduced to the diffusion unit (61) through the outlet (101) and the pipe (73), and it is further introduced into the gas phase diffusion chamber (67) through the inlet (78) and the gap (79). The mixture gas thus introduced into the gas phase diffusion chamber (67) flows downward through the space between the body material (3b) and the inside wall (67a) of the diffusion chamber (67), and finally it is discharged through the gap (68), the outlet (63), and the exhaust pipe (64) which is connected to the vacuum pump (65). While the mixture gas flows downward through the above-mentioned space, the monomer Mb contained in it comes into contact with the body material (3b) and diffuses into it. The diffusion chamber (67) is heated by hot water (71) to a temperature equal to or a little higher than that of the second storage vessel (94). This temperature is about 80° C. in the case where the monomer Mb is 3FMA. While the diffusion is performed, nitrogen is introduced into the upper chamber (76) through the pipe (72). The flow rate of nitrogen is about 5 times as much as that of the mixture gas flowing through the pipe (73).

In this embodiment, the monomer gas generator (62) and the diffusion unit (61) are separated from each other but connected by the pipe (73). Thus it is possible to adjust the flow rate of nitrogen to the bubbler (98) and the temperature of the second storage vessel (74) and to adjust the concentration of the vapor of the monomer Mb generated in the second storage vessel (94). This, in turn, makes it possible to perform diffusion with the mixture gas containing the monomer Mb in a desired concentration. The first storage vessel (89), which is kept at a low temperature, and the second storage vessel (94) are connected by the pipes (91) and (92), through which the liquid monomer Mb is circulated by the pump (95), so that the polymerization of the monomer Mb in the second storage vessel (94) is prevented. The levels of the liquid monomer Mb in the first and second storage vessels (89) and (94) can be kept balanced, if the liquid monomer Mb is supplied from the end of the pipe (87) as much as necessary to replenish the liquid monomer Mb which has been consumed by evaporation in the second storage vessel (94). Thus it is possible to vaporize the liquid monomer Mb at a constant rate in the second storage vessel (94). This leads to the uniform supply of the vapor of the monomer Mb to the diffusion chamber (67) and the uniform diffusion along the length of the body material (3b). The uniform diffusion leads to the continuous production of the light transmitting article of synthetic resin having the uniform optical properties along its length. The arrangement to evacuate the diffusion chamber (67) by the vacuum pump (65) prevents the monomer Mb from accumulating at the upper end of the teflon tube (4a). But for this arrangement, the roundness of the body material (3b) will be impaired by the accumulation of the monomer Mb and the diffusion will fluctuate along the length.

In the case where the apparatus of this embodiment is not employed, the following troubles will occur. The vapor of the monomer Mb, which is heavier than nitrogen, will become condensed in the lower part of the gas phase diffusion chamber and accumulate at the upper end of the teflon tube (4a). The accumulated monomer Mb will polymerize as time goes on, impairing the roundness of the body material (3b). This, in turn, adversely affects the axial symmetry of the distribution of the light transmitting article of synthetic resin to be produced continuously. When the monomer Mb accumulates in large amounts at the upper end of the teflon tube (4a), the accumulated monomer in the form of liquid also diffuses into the body material (3b). This means that the quantity of the monomer Mb that diffuses into the body material (3b) varies depending on the lapse of time. Under such conditions, it is impossible to produce continuously the light transmitting article of synthetic resin having the uniform optical properties.

In this embodiment, the vapor of the monomer Mb which has been introduced into the diffusion unit (61) but has not been consumed for diffusion is discharged by the vacuum pump (65) and recovered for recycling by the cold trap (66).

In this embodiment, the first and second storage vessels (89) and (94) are the same in volume. But it is also possible that the former is larger than the latter. It is also possible that they are connected by more than three pipes. The transfer of the liquid monomer Mb from the second storage vessel (94) to the first storage vessel (89) by the pump (95) may be reversed as occasion demands.

The sixth embodiment of this invention is described with reference to FIG. 7.

In this embodiment, the body material (3b) which has emerged from the teflon tube (4a) of the heating molder (4) enters the gas phase diffusion chamber (111) of the diffusion unit (110). The diffusion chamber (111) is surrounded by the jacket (112) through which a heating medium passes. The jacket (112) consists of three independent sections (112a), (112b), and (112c). The upper one is heated at a higher temperature than the lower one. The jacket provides the desired temperature gradient in the direction of the movement of the body material (3b). The liquid monomer Mb to be diffused into the body material (3b) is supplied through the pipe (113) to the reservoir (114) arranged under the diffusion chamber (111). At the bottom of the reservoir (114) is arranged the bubbler (115) through which an inert gas such as nitrogen is discharged to vaporize the liquid monomer Mb in the reservoir (114). The vaporized monomer Mb fills the diffusion chamber (111) and comes into contact with the body material (3b) made of the monomer Ma. An excess of the monomer Mb which has not diffused into the body material (3b) is discharged from the outlet (116). The body material (3b) which has emerged from the diffusion chamber (111) contains to ascend and enters the heat-treating tube (20) which is given the upward temperature gradient by a plurality of heaters (22) (four heaters, for example) which are independently controlled. The four heaters are kept at 90° C., 110° C., 120° C., and 130° C., respectively.

The body material which has undergone polymerization is discharged continuously from the top of the heat-treating tube (20) and cut to length by the cutter (not shown).

Figure 7:
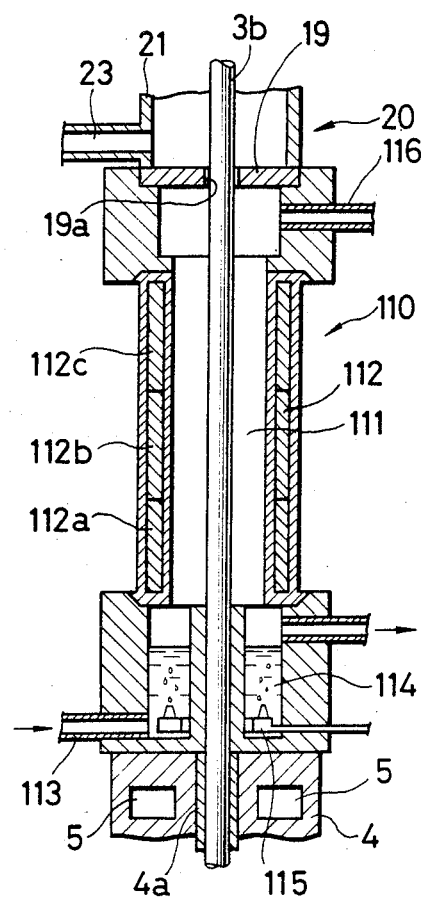
FIG. 7 is an enlarged sectional view of the diffuser unit in the apparatus used in the sixth embodiment of this invention.

In the embodiment as shown in FIG. 7, the monomer Mb is supplied to the reservoir (114) and then vaporized by the bubbler (115). But this arrangement may be replaced by that shown in FIG. 1, in which the monomer Mb is vaporized by the evaporator (8) and the vapor generated by it is introduced into the gas phase diffusion chamber.

In this embodiment, the jacket (112) is heated to give the upward temperature gradient along the direction of the movement of the body material (3b). But the downward temperature gradient is also possible.

As the diffusion temperature is raised, the diffusion rate of the monomer Mb increases and the rate of polymerization of the body material (3b) increases. As the diffusion temperature is lowered, the diffusion rate of the monomer Mb decreases and the rate of polymerization of the body material (3b) decreases. The distribution of refractive index varies depending on the combination of the diffusion rate of the monomer Mb and the rate of polymerization. The adjustment of the diffusion temperature and the diffusion time controls both the diffusion rate and the polymerization rate. Thus it is effective in producing the light transmitting article of synthetic resin having the distribution of refractive index with a minimum of overall aberration.

According to another possible arrangement, a plurality of partitioned compartments are disposed which are independently temperature-controlled in the direction of the movement of the body material (3b). Each compartment is filled with the monomer Mb in the form of gas or mist, and the body material (3b) is passed through them along the passageway penetrating the partitions.

The arrangement of this embodiment can be applied to the case where the monomer Mb to be diffused into the body material (3b) is a liquid instead of a gas or mist.

The temperature gradient to be applied to the body material (3b) at the time of diffusion should be 0.05° C. to 3.0° C. per minute, and preferably 0.2° C. to 1.2° C. per minute. If it is excessively steep, the center of the body material (3b) is completely polymerized before the monomer Mb diffuses to the center of the body material (3b). Consequently, the desired distribution of refractive index is not obtained in the vicinity of the center of the body material. On the other hand, if the temperature gradient is excessively gentle, the monomer Mb diffuses excessively into the body material before the polymerization comes to completion. In such a case, the distribution of refractive indexes becomes flat at the peripheral part of the body material.

The diffusion temperature should be 20° C. to 100° C., and preferably 60° C. to 90° C. If the temperature of the body material (3b) and the temperature of the environment surrounding it are excessively high, polymerization comes to completion before the addition of the monomer Mb reaches the center of the body material. On the other hand, if they are excessively low, an excessive amount of monomer Mb diffuses before polymerization comes to completion, with the result that there is no difference in refractive index between the center and the periphery of the body material.

When the diffusion is performed at the above-mentioned temperature with the above-mentioned temperature gradient, it is possible to balance the rate of polymerization of the monomer Ma constituting the body material and the monomer Mb being diffused with the rate of diffusion of the monomer Mb into the body material. Thus it is possible to produce the satisfactory light transmitting article of synthetic resin having the radial distribution of refractive index as defined by the equation (1) or (3).

The seventh embodiment of this invention is described with reference to FIG. 8.

In this embodiment, the body material (3b) formed by the teflon tube (4a) in the heating molder (4) passes through the cylindrical impregnated body (121) which is impregnated with the monomer Mb in the following manner. The liquid monomer Mb is supplied from the reservoir (123) to the impregnated body (121) through the pipes (124) and (125) by the micro-constant delivery pump (122). The liquid monomer Mb thus supplied infiltrates into the impregnated body (121) and flows downward through it by gravity. Thus the impregnated body (121) is kept impregnated with the monomer Mb at all times. The monomer Mb which has passed through the impregnated body (121) is collected by the receiving pan (126) disposed at the bottom of the diffuser unit (120) and then returned to the reservoir (123) through the outlet (126a), the pipe (127), and the separator (128). The separator (128) separates the monomer Mb from impurities such as monomer Ma which the body material (3b) might discharge when it passes through the hole (121a) in the impregnated body (121). The thus separated impurities are discharged through the discharge pipe (130).

As the body material (3b) passes through the hole (121a) in the impregnated body (121), the monomer Mb diffuses to the center of the body material (3b) since the inside of the hole is kept wet with the monomer Mb. The possibility of the body material (3b) being scratched by the hole (121a) can be avoided by polishing its inside wall or by removing sharp angles on its inside wall by chemical treatment.

The hole (121a) in the impregnated body (121) should have a little larger diameter than that of the body material (3b) formed by the heating molder (4).

The temperature of the impregnated body (121) should be kept such that the upper part is higher than the lower part. A proper temperature gradient should be established according to the desired distribution of refractive index.

The impregnated body (121) may be made from any substance, soft or hard, that can be impregnated with the monomer Mb. Examples of suitable substances include high molecular organic materials such as polyolefin, polycarbonate, polyurethane, cellulose, and phenolic resin; porous bodies made by sintering or foaming from organic polymers such as polyether, polycarbonate, polyester, polyamide, and polyolefin in which macromonomers having cross linking functional groups such as groups having double bond and silanol groups at the both ends of the oligomer are polymerized; sintered glass and ceramics; and foamed metal and sintered metal.

According to this embodiment, it is possible to overcome the above-mentioned drawback involved in the case where the body material (3b) is steeped in the liquid monomer Mb, because the monomer Mb continues to flow on the surface of the body material (3b) even when the upper part of the impregnated body (121) is kept at a temperature that would permit the copolymerization of the body material (3b) and the monomer Mb which has diffused into the body material (3b) and fix the distribution of the monomer Mb in the body material (3b). This also applies to the case where the impregnation of the impregnated body (121) is accomplished by merely steeping it in the liquid monomer Mb. In such a case, the monomer Mb picked up by the impregnated body (121) flows down naturally through the impregnated body (121) and the inside of the upper part of the hole (121a) is not wetted with the monomer Mb. Thus, if the temperature of the upper part of the impregnated body (121) is properly selected, the monomer Mb in the form of gas comes into contact with the body material (3b) at the upper part of the hole (121a).

According to this embodiment, the monomer Mb in the form of liquid comes into contact with the body material (3b) when the body material (3b) passes through the hole (121a), with the inside thereof wetted with the monomer Mb. Therefore, the monomer Mb to be used in this embodiment does not necessarily have to have a high vapor pressure. It is possible to produce a variety of light transmitting articles of synthetic resin by properly combining the body material (3b) and the monomer Mb.

The hole (121a) in the impregnated body (121) need not necessarily be cylindrical. The upper part thereof may be funneled so that the vapor of the monomer Mb fills the space between the body material (3b) and the funneled part which is properly heated.

The shape and number of the impregnated body (121) are not limited to the illustrated ones. For example, it may be made up of a plurality of thick semicylindrical bodies arranged around the same axis at intervals of 180°.

According to this embodiment, the monomer Mb is continuously supplied to the top of the impregnated body (121); but it is also possible that the impregnated body (121) is previously steeped in the liquid monomer Mb for impregnation.

Figure 8:
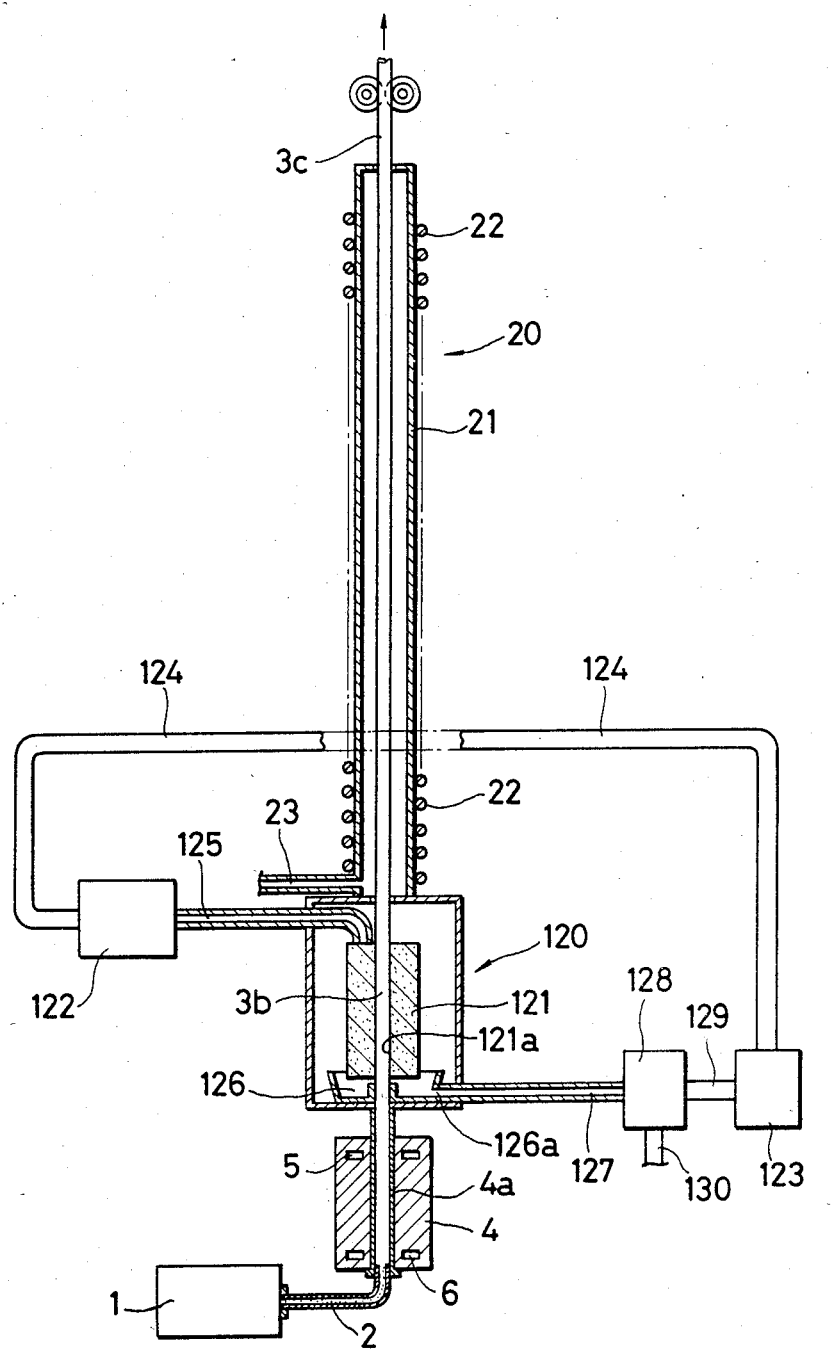
FIG. 8 is a schematic longitudinal sectional view of the apparatus for producing a light transmitting article of synthetic resin according to the senventh embodiment of this invention.

The embodiment as shown in FIG. 8 may be modified as follows: A reservoir for the liquid monomer Mb is installed at the bottom of the diffusion unit (120) and the liquid monomer Mb is vaporized by bubbling nitrogen so that the vapor of the monomer Mb fills the upper part of the diffusion unit and diffuses, in the form of gas, into the body material.

The eighth embodiment of this invention is described with reference to FIGS. 9 and 10.

Figure 9:
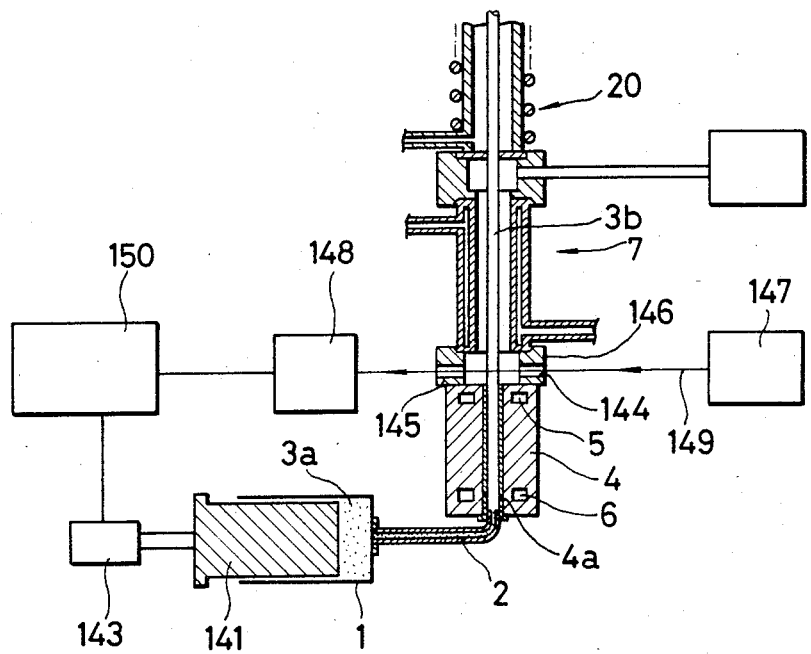
FIG. 9 is a schematic longitudinal sectional view of the apparatus for producing a light transmitting article of synthetic resin according to the eighth embodiment of this invention.
Figure 10:
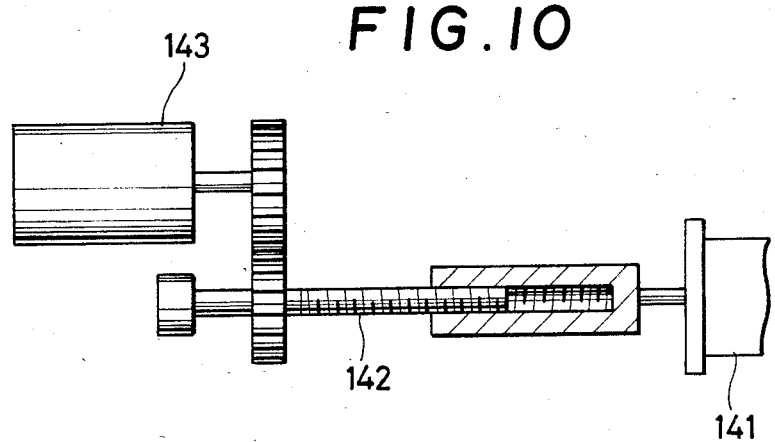
FIG. 10 is an enlarged schematic view of the plunger drive mechanism in the apparatus of FIG. 9.

In FIG. 9, there is shown the water-cooled cylinder (1) which contains the prepolymer fluid (3a) as the raw material of the light transmitting article of synthetic resin. The cylinder (1) holds the plunger (141) to force the prepolymer fluid (3a) into the feed pipe (2). The plunger (141) is moved back and forth by the screw (142) driven by the motor (143).

The heating molder (4), the diffusion unit (7), and the heat-treating tube (20) used in this embodiment are the same as those used in the embodiment illustrated in FIG. 1, with the exception that the pipe (146) is interposed between the heating molder (4) and the diffusion unit (7). This pipe (144) is provided with two parallel glass windows (144) and (145) through which the diameter of the body material is measured. The laser transmitter (147) and the laser receiver (148) are arranged so that the laser beam (149) scans across the body material (3b) through the window (144). The diameter of the body material is calculated from the scanning time of the laser beam (149). The laser receiver (148) transmits the difference between the measured value and the set value to the diameter controller (150). The diameter controller (150) issues a feed-back signal to the extruder motor (143) to regulate the speed of the plunger so that the diameter of the body material (3b) is restored to the set value.

This embodiment is advantageous over the conventional technology in which the fluctuation of the diameter of the body material (3b) was inevitable for the reasons mentioned below. Certain fluctuation in the plunger speed is unavoidable due to errors in the drive screw (142) and the drive motor (143). There is a limit to the precision of the inside diameter of the cylinder. Thus the prepolymer fluid (3a) extruded from the extruder (1) fluctuates in volume rate of flow. The fluctuation of the volume is enhanced as the prepolymer (3a) undergoes heat polymerization. The fluctuation in volume rate of flow affects the diameter of the body material (3b) because it is pulled up at a constant rate. The fluctuation in diameter leads to the fluctuation in the distribution of refractive index after the diffusion of the monomer Mb.

The above-mentioned disadvantages are overcome in this embodiment on account of the control of the extrusion rate of the prepolymer fluid (3a), said control being accomplished according to the measurements of the diameter of the body material formed by the heating molder (4).

In this invention, the monomer Ma used to form the transparent network polymer Pa having a refractive index of Na may be a simple substance or a mixture of monomers. The preferred monomer Ma is one which has two or more double bonds such as allyl group, acrylic acid group, methacrylic acid group, and vinyl group, individually or in combination. Examples of the monomer Ma are as follows:

(1) Allyl compounds and a mixture thereof:

Diallyl esters such as diallyl phthalate, diallyl isophthalate, diallyl terephthalate, and diethylene glycol bisallyl carbonate; triallyl esters such as triallyl trimellitate, triallyl phosphate, and triallyl phosphite; and allyl esters of unsaturated acid such as allyl methacrylate and allyl acrylate.

(2) Compounds represented by $R_1$–$R_2$–$R_3$ and a mixture thereof:

Compounds in which both $R_1$ and $R_3$ are vinyl groups, acrylic acid groups, vinyl ester groups, or methacrylic acid groups; and compounds in which either $R_1$ or $R_3$ is a vinyl group, acrylic acid group, vinyl ester group, or methacrylic acid group, and the other is any one of the remaining three groups. The group $R_2$ is selected from the following divalent groups.

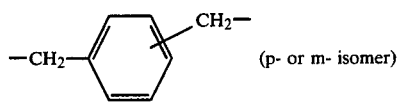
(p- or m- isomer)

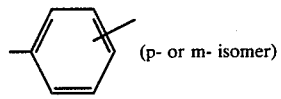
(p- or m- isomer)

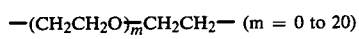
(m = 0 to 20)

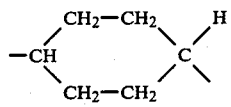

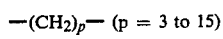
(p = 3 to 15)

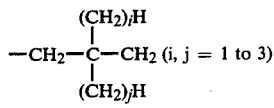
(i, j = 1 to 3)

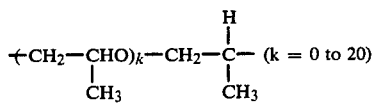
(k = 0 to 20)

(3) A mixture of the above monomers (1) and (2), or a mixture of either of the above monomer (1) or (2) (or a mixture thereof) and at least one kind of monovinyl compound, vinyl ester, acrylate ester, and methacrylate ester.

The monomer Mb used in this invention is selected from those monomers which, upon polymerization, form a transparent polymer Pb having a refractive index Nb which is higher than or lower than the above-mentioned refractive index Na. The monomer Mb may be a simple substance or a mixture of monomers. The polymer Pb may be either a network polymer or a linear polymer. If the refractive index Nb is smaller than the refractive index Na, the resulting light transmitting article has the distribution of refractive index as defined by the equation (1) and works as a convex lens. Conversely, if the refractive index Nb is greater than the refractive index Na, the resulting light transmitting article has the distribution of refractive index as defined by the equation (3) and works as a concave lens. The difference between the refractive indexes (|Na−Nb|) should preferably be greater than 0.005. If the difference is too small, the gradient of refractive index is not obtained as desired. In the case where the diffusion is carried out in the gas phase, the monomer Mb should preferably have a comparatively high vapor pressure, say a saturated vapor pressure higher than 5 mmHg at the diffusion temperature. Examples of such monomer Mb include styrene, methacrylate ester, acrylate ester, vinyl acetate, vinyl chloride, acrylonitrile, and butadiene, and a mixture thereof.

The additional examples of the monomer Mb include compounds represented by the formula $$CH_2=CHOC-R_4$$
$$\parallel$$
$$O$$

and mixtures thereof with the above-mentioned compounds, wherein $R_4$ denotes $-(CH_2)_f-CH_3$ (f=0 to 2), $-(CH_2)_gH$ (g=1 to 3),

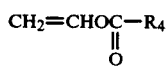

(h, l=0 to 2).

The combination of the network polymer Pa and the monomer Mb should be selected so that the resulting light transmitting article has low chromatic aberration. Examples of the combination in the case where Na is greater than Nb include diallyl phthalate polymer and methyl methacrylate, diallyl phthalate polymer and a mixture of methyl acrylate and methyl methacrylate, diallyl isophthalate polymer and methyl methacrylate, diallyl phthalate-styrene copolymer and methacrylate ester, diallyl isophthalate-styrene copolymer and acrylate ester, divinyl phthalate-divinyl benzoate copolymer and methacrylate ester, divinyl isophthalate-vinyl benzoate copolymer and methacrylate ester, and vinyl benzoate-diallyl isophthalate copolymer and methacrylate ester. Examples of the combination in the case where Na is smaller than Nb include diethylene glycol bisallyl carbonate polymer and styrene, and diethylene glycol bisallyl carbonate polymer and diallyl isophthalate.

The preferred combination of monomer Ma and monomer Mb that provides the light transmitting article having low chromatic aberration is given below.

(a) Monomer Ma: Diethylene glycol bisallyl carbonate, or a mixture thereof with diallyl phthalate, diallyl isophthalate, vinyl benzoate, or styrene. (The content of diethylene glycol bisallyl carbonate in the mixture should be greater than 50 wt%, preferably greater than 70 wt%.)

Monomer Mb: Compounds represented by the formula (A) or a mixture thereof.

$$\overset{X}{\underset{|}{CH_2=C-COOY}} \quad (A)$$

wherein X is hydrogen or a methyl group; and Y is a group selected from the group consisting of phenyl group, methylphenyl group, vinyl group, $-(CH_2)_lH$ (l=1 to 8), i-propyl group, i-butyl group, s-butyl group, t-butyl group,

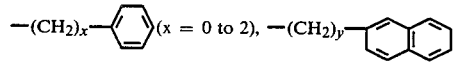

(y = 0 to 2), and $-(CH_2CH_2O)_zCH_3$ (z = 1 to 3).

(b) Monomer Ma: Diethylene glycol bisallyl carbonate, or a mixture thereof with methyl acrylate, ethyl acrylate, n-butyl methacrylate, or t-butyl methacrylate. (The content of diethylene glycol bisallyl carbonate in the mixture should be greater than 10 wt%.)

Monomer Mb: Fluorine-containing alcohol ester of methacrylic acid or acrylic acid represented by the formula (B) or a mixture thereof.

$$\overset{X}{\underset{|}{CH_2=C-COOY}} \quad (B)$$

wherein X is hydrogen or a methyl group; and Y is a group selected from the group consisting of $-(CF_2)_iF$ (i=1 to 6), $-CH_2(CF_2)_jH$ (j=1 to 8), $-CH_2CH_2OCH_2CF_3$, $-(CH_2CH_2O)_kCF_2CF_2H$ (k=1 to 4), $-CH_2CH_2OCH_2(CF_2)_lF$ (l=1 to 6), and $-CH_2(CF_2)_mO(CF_2)_nF$ (m=1 to 2, n=1 to 4); or a compound (C) represented by the formula (B) wherein Y is $-Si(OC_2H_5)_3$.

(c) Monomer Ma: A mixture of diethylene glycol bisallyl carbonate and the compound (B) or (C). (The content of diethylene glycol bisallyl carbonate in the mixture should be greater than 10 wt%.)

Monomer Mb: The compound (A).

The gelling rate of the body material can be adjusted by incorporating the crosslinkable monomer Ma with a monomer having one unsaturated group or a chain transfer agent such as $CBr_4$, $CCl_4$, and mercaptan, or both.

The monomer Mc used in the second embodiment is a monomer which is the same as or different from the monomer Mb, and it forms the polymer Pc having a refractive index of Nc. The monomer Mc may be a simple substance or a mixture of monomers. The compounds enumerated as the examples of the monomer Mb can be used as the monomer Mc. Those having a high vapor pressure are preferred.

The invention is now described in more detail with reference to the following examples.

EXAMPLE 1

The prepolymer fluid was prepared by heating diethylene glycol bisallyl carbonate (CR-39) containing 3.0 wt% of benzoyl peroxide (BPO), a polymerization initiator, at 75° C. for 65 minutes. This prepolymer had a viscosity of about 1,000 cps at 20° C.

The prepolymer fluid was charged into the extruder (1) and fed continuously to the teflon tube (4a), 4 mm in diameter and 200 mm long, which passes through the heating molder (4), at a constant rate of $6.3 \times 10^{-2}$ ml/min. The heating molder (4) had an upward temperature gradient produced by hot water (78° C.) circulating in its upper part and hot water (58° C.) circulating in its lower part. While passing through the teflon tube (4a) over 40 minutes, the prepolymer (3a) gelled to form the body material (3b), 4 mm in diameter. The body material was composed of 25 wt% of acetone-insoluble component (network polymer), 5 wt% of acetone-soluble and methanol-insoluble component (linear polymer), and 70 wt% of acetone-soluble and methanol-soluble component (monomer and oligomers).

The body material (3b) was pulled up into the diffusion unit (7) at a rate of 0.52 cm/min by means of the take-up motors (24) and (25). The monomer Mb (1,1,5-trihydroperfluoropentyl methacrylate (8FMA)), which had been atomized by ultrasonic (1.625–1.7 MHz) in the atomizer (8), was fed at a flow rate of 200 ml/min by the aid of nitrogen carrier gas, into the diffusion unit (7) heated at 50° C. by hot water (17). The body material was allowed to pass through the diffusion unit (7) over about 50 minutes. During this period, the monomer Mb diffused into the body material (3b) and the body material (3b) partially polymerized. The unused monomer Mb in the form of mist was recovered through the outlet (13) at a flow rate of 2.0 l/min by the vacuum pump (12).

Following the diffusion process, the body material (3b) was introduced into the heat-treating tube (20), with the atmosphere replaced with nitrogen. While passing through the heat-treating tube (20) over about 6 hours, the polymerization of the body material (3b) came to completion. Thus there was obtained continuously the light transmitting article of synthetic resin (3c). The heat-treating tube (20) is made up of four sections, each kept at 90° C. (bottom), 110° C., 120° C., and 130° C. (top), so that the heat treatment rises stepwise.

The thus produced light transmitting article of synthetic resin was a cylindrical convex lens, 4 mm in diameter, having the uniform optical properties. It had $A = 2.45 \times 10^{-2}/mm^2$ (constant of distribution of refractive index in equation (1)) and $L = 41.5$ mm (pitch) in equation (2). Since the light transmitting article had the distribution of refractive index defined by equation (1) across its entire cross-section, it was not necessary to shave the periphery of it. It had a numerical aperture $NA = 0.47$, which indicates that its performance as a convex lens is superior.

The monomer Mb (8FMA) recovered from the diffusion unit (7) was able to be recycled many times because almost no polymerization took place in it during the recovery process.

In view of the fact that 8FMA used as the monomer Mb in this example has a boiling point of 57°–60° C./6 mmHg, it would give a light transmitting article having a gentle gradient of refractive index ($L > 200$ mm) if the conventional technology had been employed.

EXAMPLE 2

The prepolymer fluid was prepared from CR-39 in the same way as in Example 1, and the prepolymer fluid was formed into the body material (3b) by gelation in the heating molder (4). The body material (3b) was introduced into the diffusion unit (7) filled with the mist of phenyl methacrylate (PhMA) generated by nitrogen spray in the atomizer (8). While the body material (3b) passed through the diffusion unit over 200 minutes, the PhMA was diffused, with partial polymerization. The body material (3b) which had undergone diffusion was subjected to heat treatment in the same way as in Example 1, whereby there was obtained continuously the light transmitting article of synthetic resin (3c). It was 4 mm in diameter and had the optical properties of a cylindrical concave lens, with the constant of distribution of refractive index being $B = 6.3 \times 10^{-3}/mm^2$.

EXAMPLE 3

The prepolymer fluid (having a viscosity of 1015 cp at 20° C., and $2.57 \times 10^{-2}$ cm$^2$/dyne/sec and 1.21 for the values of K and n in equation (4), respectively) was prepared in the same way as in Example 1. The prepolymer fluid was formed into the body material (3b), 4 mm in diameter. It was composed of 25 wt% of acetone-insoluble component (network polymer), 5 wt% of acetone-soluble and methanol-insoluble component (linear polymer), and 70 wt% of acetone-soluble and methanol-soluble component (monomer and oligomers).

The body material (3b) was pulled up into the diffusion unit (30) shown in FIG. 3 at a rate of 0.25 cm/min by means of the take-up means. The monomer Mb (1,1,3-trihydroperfluoropropyl methacrylate (4FMA)) was fed at a flow rate of 1.0 ml/min into the liquid phase diffusion chamber (31). Polymerization inhibitor was not added to 4FMA. 4FMA was vaporized by the bubbling of nitrogen introduced at a flow rate of 200 ml/min so as to fill the gas phase diffusion chamber. The liquid phase diffusion chamber (31) and the gas phase diffusion chamber (35) were kept at 70° C. and 80° C., respectively, by circulating hot water around them. The unused vapor of 4FMA was recovered at a flow rate of 800 ml/min by the vacuum pump. 4FMA recovered from the gas phase diffusion chamber (35) and the liquid phase diffusion chamber (31) was recycled many times because almost no polymerization took place in it during the recovery process. Incidentally, the atmosphere of the gas phase diffusion chamber (35) had previously been replaced with a nitrogen stream at a flow rate of 1000 ml/min.

While the body material (3b) passed through the liquid diffusion chamber (31) and the gas phase diffusion chamber (35) over about 5 minutes and about 30 minutes, respectively, 4FMA was diffused, with partial polymerization by heating.

Following the diffusion process, the body material (3b) was introduced into the heat-treating tube (20), in which heat treatment was performed in the same way as in Example 1.

The thus produced light transmitting article of synthetic resin was a cylindrical convex lens, 4 mm in diameter, having the uniform optical properties. It had $A = 2.22 \times 10^{-2}/mm^2$ (in equation (1)) and $L = 42.5$ mm (in equation (2)). Since the light transmitting article had the distribution of refractive index defined by equation (1) across its entire cross-section, it was not necessary to shave the periphery of it. It had a numerical aperture $NA = 0.45$, which indicates that its performance as a convex lens is superior.

EXAMPLE 4

The prepolymer was prepared by heating ethylene glycol dimethacrylate (EDMA) containing 0.10 wt% of BPO and 0.50 wt% of carbon tetrabromide (CBr$_4$) at 45° C. for 50 minutes in the nitrogen atmosphere. The viscosity was 930 cp at 20° C.; $K = 3.23 \times 10^{-2}$ cm$^2$/dyne/sec; and $n = 1.19$.

The prepolymer was charged into the extruder (1) in the same way as in Example 1. It was fed continuously into the teflon tube (4a) (4 mm in inside diameter and 96 mm long) held in the heating molder (4) at a flow rate of $6.0 \times 10^{-2}$ ml/min. The heating molder (4) was kept at 60° C. (at top) and 30° C. (at bottom) by warm water circulating around it. While passing through the teflon tube (4a), the prepolymer (3a) gelled to form the transparent body material (3b), 4 mm in diameter. It was composed of 15.5 wt% of acetone-insoluble component (network polymer), 0.3 wt% of acetone-soluble and methanol-insoluble component (linear polymer), and 84.2 wt% of acetone-soluble and methanol-soluble component (monomer and oligomers).

The body material (3b) as introduced into the liquid diffusion chamber (31) shown in FIG. 3 into which 4FMA was being fed at a flow rate of 1.0 ml/min. The liquid diffusion chamber (31) was kept at 60° C. The diffusion of 4FMA was accomplished while the body material (3b) passed through the liquid diffusion chamber (31) over about 5 minutes. 4FMA was vaporized by the bubbling of nitrogen (200 ml/min) through the bubbler placed 24 mm deep in 4FMA, so that the gas phase chamber (35) was filled with the vapor of 4FMA. The unused vapor of 4FMA was recovered at a flow rate of 800 ml/min. The gas phase diffusion chamber (35) was kept at 65° C. by circulating hot water through the 72-mm long jacket (32). The residence time of the body material (3b) in the gas phase diffusion chamber (35) was about 15 minutes.

After the diffusion of 4FMA with partial polymerization, the body material (3b) was introduced into the heat-treating tube (20) in which polymerization was brought to completion by heating. The heat-treating tube was given an upward temperature gradient of 65° C., 70° C., 85° C., and 100° C. by the heater (22). Thus there was produced continuously the rod-like light transmitting article (3c). The distribution of refractive indexes was found in the radius of 1.68 mm (84% of the total radius). It was a cylindrical convex lens having $A = 3.03 \times 10^{-2}/mm^2$; $L = 36.1$ mm; and numerical aperture $NA = 0.36$ within the diameter of 2.7 mm.

EXAMPLE 5

The body material (3b), 4 mm in diameter, was prepared in the same way as in Example 3. It was introduced at a rate of 0.52 cm/min into the gas phase diffusion unit (7) shown in FIG. 1. In the residence time of about 40 minutes, the vapor of 2,2,2-trifluoroethyl methacrylate (3FMA) containing 0.01 wt% of hydroquinone (HQ), a polymerization inhibitor, was diffused, with partial polymerization. 3FMA was vaporized by the vaporizer (8), and the vapor was introduced into the diffusion chamber (11) through the inlet (10). The unused vapor of 3FMA was recovered by the pump (12) through the outlet (13). The recovered 3FMA was recycled many times because almost no polymerization took place in it. The atmosphere of the diffusion chamber (11) had previously been replaced with nitrogen at a flow rate of 1000 ml/min prior to the introduction of 3FMA. The diffusion chamber (11) was kept at 80° C. by circulating hot water (17) through the jacket.

Following the diffusion process, the body material (3b) was introduced into the heat-treating tube (20), in which heat treatment was performed in the same way as in Example 1.

The thus produced light transmitting article of synthetic resin was a cylindrical convex lens, 4 mm in diameter, having the uniform optical properties. It had $A = 2.19 \times 10^{-2}/mm^2$ (in equation (1)) and $L = 42.5$ mm (in equation (2)). Since the light transmitting article had the distribution of refractive index defined by equation (1) across its entire cross-section, it was not necessary to shave the periphery of it. It had a numerical aperture $NA = 0.44$, which indicates that its performance as a convex lens is superior.

EXAMPLE 6

The body material prepared from CR-39 in the same way as in Example 5 was introduced into the gas phase diffusion unit (50) shown in FIG. 5. In the residence time of about 48 minutes, the vapor of 3FMA was diffused, with partial polymerization. The 3FMA in the monomer reservoir at the bottom of the diffusion unit (50) was kept at 80° C., and the diffusion unit (50) was heated by hot water (17) at 80° C. circulating in the jacket. No polymerization inhibitor was added to 3FMA. The 3FMA was vaporized by the bubbling of nitrogen introduced at a flow rate of 200 ml/min. The unused vapor of 3FMA was recovered at a flow rate of 800 ml/min by the pump through the outlet (57). The recovered 3FMA was recycled many times because almost no polymerization took place in it and it contained no polymerization inhibitor. Following the diffusion process, the body material (3b) underwent heat treatment in the same way as in Example 1 to give continuously the rod-like light transmitting article (3c), which had the distribution of refractive index of equation (1) throughout the entire cross-section. It also had the numerical aperture $NA = 0.43$.

EXAMPLE 7

The prepolymer was prepared by heating tetraethylene glycol dimethacrylate (4ED) containing 0.10 wt% of BPO at 50° C. for 10 minutes. The viscosity was 950 cp at 20° C.; $K = 3.35 \times 10^{-2}$ cm$^2$/dyne/sec; and $n = 1.18$.

The prepolymer was charged into the extruder (1) in the same way as in Example 1. It was fed continuously into the teflon tube (4a) (4 mm in inside diameter and 200 mm long) held in the heating molder (4) at a flow rate of $6.0 \times 10^{-2}$ ml/min. The heating molder (4) was kept at 55° C. (at top) and 25° C. (at bottom) by warm water circulating around it. While passing through the teflon tube (4a), the prepolymer (3a) gelled to form the transparent body material (3b), 4 mm in diameter. It was composed of 21 wt% of acetone-insoluble component (network polymer), 1 wt% of acetone-soluble and methanol-insoluble component (linear polymer), and 78 wt% of acetone-soluble and methanol-soluble component (monomer and oligomers).

The body material (3b) was introduced into the gas phase diffusion unit (50) shown in FIG. 5 at a rate of 0.48 cm/min. To the monomer reservoir (51) at the bottom of the diffusion unit (50) was supplied 3FMA at a flow rate of 1.0 ml/min. 3FMA was vaporized by bubbling nitrogen from the bubbler (52) at a flow rate of 200 ml/min. A nitrogen stream containing 3FMA was formed in the diffusion chamber (53) by supplying nitrogen at a flow rate of 1100 ml/min through the inlet at the upper part of the heat-treating tube (20), and at the same time, sucking the gas by the pump at a flow rate of 800 ml/min. Both the monomer reservoir (51) and the external pipe thereof were kept at 55° C. While the body material (3b) passed through the diffusion unit (50) over about 52 minutes, the diffusion of 3FMA was accomplished with partial polymerization. Following the diffusion process, the body material (3b) was introduced into the heat-treating tube (20), 1400 mm long, and in the residence time of 5 hours, polymerization was brought to completion. The heat-treating tube (20) was given an upward temperature gradient of 55° C., 70° C., 85° C., and 100° C. Thus there was produced continuously the rod-like light transmitting article (3c). The distribution of refractive indexes was found in the radius of 1.68 mm (84% of the total radius). It was a cylindrical convex lens having $A=1.87\times10^{-2}/mm^2$; $L=45.0$ mm; and numerical aperture $NA=0.34$ within the diameter of 3.3 mm.

EXAMPLE 8

The prepolymer fluid (having a viscosity of 1009 cp at 20° C., and $2.57\times10^{-2}$ cm$^2$/dyne/sec and 1.21 for the values of K and n in equation (4), respectively,) was prepared in the same way as in Example 1. The prepolymer was charged into the extruder (1) as shown in FIG. 1 and then continuously fed at a flow rate of $6.3\times10^{-2}$ ml/min into the teflon tube (4a) (3 mm in diameter and 200 mm long) penetrating the heating molder (4). The heating molder (4) was given an upward temperature gradient by passing hot water (6) (64° C.) through the lower jacket and hot water (5) (80° C.) through the upper jacket. While passing through the teflon tube (4a) over 40 minutes, the prepolymer (3a) gelled to form the body material (3b), 3 mm in diameter. It was composed of 25 wt% of acetone-insoluble component (network polymer), 5 wt% of acetone-soluble and methanol-insoluble component (linear polymer), and 70 wt% of acetone-soluble and methanol-soluble component (monomer and oligomers).

The body material (3b) was pulled up into the gas phase diffusion chamber (111) as shown in FIG. 7 at a rate of 0.52 cm/min by means of the take-up unit. The vapor of the monomer Mb was generated by using the vaporizer (8) shown in FIG. 1. The monomer Mb was 2,2,2-trifluoroethyl methacrylate (3FMA) containing 0.01 wt% of hydroquinone (HQ) as a polymerization inhibitor. The vapor of 3FMA generated by the vaporizer (8) was introduced into the diffusion chamber (111) and it was diffused into the body material (3b) with partial polymerization during its residence time of about 40 minutes. Prior to the introduction of 3FMA, the atmosphere of the diffusion chamber (111) had been replaced with nitrogen supplied at a flow rate of 1000 ml/min. The temperature of the lower part of the diffusion chamber (111) was 80° C., and the jackets (112a), (112b), and (112c) were supplied with hot water at 75° C., 80° C., and 85° C., respectively.

After the diffusion process, the body material (3b) was introduced into the heat-treating tube (20) and subjected to heat treatment in the same way as in Example 1.

The rod-like body (3c), 3 mm in diameter, thus obtained continuously was made into a cylindrical convex lens, or a light transmitting article, having uniform optical properties by polishing both ends parallel. Its characteristic values were: $A=3.10\times10^{-2}/mm^2$ and $NA=0.39$.

The spherical aberration was less than 20 μm in the central area and less than 100 μm in the peripheral area. It is about 5 times better in the central area and about 6 times better in the peripheral area than that of the product produced by diffusion at a uniform temperature.

EXAMPLE 9

The body material (3b), 4 mm in diameter, was prepared in the same way as in Example 1, and it was introduced into the diffusion chamber (120) as shown in FIG. 8.

The impregnated body (121) was sintered glass having a hole (121a), 4.5 mm in diameter, and a 1 mm thick wall, with the sharp angles removed by dipping in an aqueous solution of sodium hydroxide. The monomer Mb for impregnation was trihydroperfluoropropyl methacrylate (4FMA) containing no polymerization inhibitor. 4FMA was supplied to the top of the impregnated body (121) at a flow rate of 1.0 ml/min.

The body material (3b) was introduced into the diffusion unit (120) at a rate of 0.4 cm/min so that it passed through the hole (121a) in the impregnated body (121) over 23 minutes. During the passing, 4FMA was diffused into the body material (3b) with partial polymerization. The upper and lower parts of the diffusion unit (120) were kept at 70° C. and 50° C., respectively. After the diffusion process, the body material (3b) was introduced into the heat-treating tube (20) in which heat treatment was performed in the same way as in Example 1.

The thus produced light transmitting article of synthetic resin (3c) was a cylindrical convex lens, 4 mm in diameter, having the uniform optical properties. It had $A=2.01\times10^{-2}/mm^2$ (constant of distribution of refractive index) and $L=44.3$ mm (pitch). Since the light transmitting article had the distribution of refractive index defined by equation (1) across its entire cross-section, it was not necessary to shave the periphery of it. It had a numerical aperture $NA=0.47$, which indicates that its performance as a convex lens is superior.

EXAMPLE 10

The prepolymer fluid (having a viscosity of 1000 cp at 20° C., and 1.20 for the values of n in equation (4)) was prepared in the same way as in Example 1. The prepolymer was formed into the body material (3b), 4 mm in diameter, in the same way as in Example 1, by using the apparatus as shown in FIG. 9. The body material (3b) was composed of 25 wt% of acetone-insoluble component (network polymer), 5 wt% of acetone-soluble and methanol-insoluble component (linear polymer), and 70 wt% of acetone-soluble and methanol-soluble component (monomer and oligomers).

The body material (3b) was pulled up into the diffusion unit (7) at a rate of 0.52 cm/min. The diameter of the body material (3b) was measured by scanning the He-Ne laser (1 mW) by using a tuning fork, through the windows (144) and (145) attached to the cylinder (146). (The diameter was calculated from the change of amount of light detected by the receiver (148).) The measured diameter is compared with the set value, and signals for the difference are transmitted to the diameter controller (150) which performs PID control calculations and regulates the drive voltage for the extruder motor (143). The coefficients of P, I, and D were 30%, 7 minutes, and 0.1 minutes, respectively. This feedback control reduced the fluctuation of the diameter (4.00 mm) of the body material (3b) from ±60 μm to ±5 μm. It also reduced the fluctuation of the diameter of the finished light transmitting article (3c), which had been completely polymerized, from ±80 μm to ±15 μm.

What is claimed is:

1. A method of producing a light transmitting article from synthetic resin by partially polymerizing a monomer Ma which forms a network polymer Pa having a refractive index Na to form a self-supporting polymeric body material, and subsequently diffusing a monomer Mb, which forms a polymer Pb having a refractive index Nb different from the refractive index Na, into said body material and simultaneously polymerizing said monomer Mb, comprising the steps of continuously drawing out a polymeric body material from a molding means in which said body material has been formed and is ready for the diffusion of the monomer Mb, continuously passing said polymeric body material through a diffusion means and a heating means thereby diffusing the monomer Mb into said polymeric body material by the aid of said diffusion means, and then continuously heating said polymeric body material to complete polymerization of said polymeric body so that the distribution of said monomer Mb is fixed in said polymeric body material.

2. A method of producing a light transmitting article of synthetic resin as claimed in claim 1, wherein the diffusion in said diffusion means is accomplished by passing said monomer Mb in the form of gas or mist along the direction in which said body material moves through said diffusion means.

3. A method of producing a light transmitting article of synthetic resin as claimed in claim 1, wherein the monomer Mb in the form of liquid is brought into contact with the body material for diffusion and the body material is subjected to heat polymerization, and at least the initial stage of the heat polymerization is performed in an atmosphere containing a monomer Mc in the form of gas or mist, said monomer Mc being the same as or different from the monomer Mb and forming a polymer Pc having a refractive index Nc which satisfies any one of the following conditions:

(a) Nc=Nb
(b) Nc<Na and Nb<Na
(c) Nc>Na and Nb>Na.

4. A method of producing a light transmitting article of synthetic resin as claimed in claim 3, wherein the monomer Mc is contained in an amount equivalent to at least 20% of the saturated concentration thereof.

5. A method of producing a light transmitting article of synthetic resin as claimed in claim 3, wherein the monomer Mc is identical with the monomer Mb.

6. A method of producing a light transmitting article of synthetic resin as claimed in claim 1, wherein said body material is produced by passing a prepolymer through a thin passageway and polymerizing it during its travel, said prepolymer being prepared by preliminarily polymerizing the monomer Ma so that it exhibits the plastic flow represented by the equation $$D = K\sigma^n$$

wherein D is the shear rate, $\sigma$ is the shear stress, K is the reciprocal of the plastic viscosity, and n is a constant greater than 1.10 at 20° C.

7. A method of producing a light transmitting article of synthetic resin as claimed in claim 6, wherein the value of n is 1.10 to 1.50.

8. A method of producing a light transmitting article of synthetic resin as claimed in claim 6, wherein the prepolymer passing through the thin passageway is heated at a rate of 0.1° to 1.0° C. per minute.

9. A method of producing a light transmitting article of synthetic resin as claimed in claim 6, wherein the thin passageway has a round cross section.

10. A method of producing a light transmitting article of synthetic resin as claimed in claim 1, wherein the diffusion is performed by moving the body material along a body impregnated with said monomer Mb.

11. A method of producing a light transmitting article of synthetic resin as claimed in claim 1, wherein the diffusion rate of the monomer Mb and the polymerization rate of the body material are controlled by providing a stepwise or continuous temperature gradient in the diffusion process.

12. A method of producing a light transmitting article of synthetic resin as claimed in claim 1, wherein the diameter of the body material emerging continuously from the molding means is measured in the vicinity of the outlet of the molding means, and the feed of the prepolymer to the molding means is controlled according to the measured value.

* * * * *

UNITED STATES PATENT AND TRADEMARK OFFICE
CERTIFICATE OF CORRECTION

PATENT NO. : 4,587,065
DATED : May 6, 1986
INVENTOR(S) : Kouichi et al.

It is certified that error appears in the above-identified patent and that said Letters Patent is hereby corrected as shown below:

Column 12, line 15, "(94)" should be -- (89) --;

Column 14, line 31, "contains" should be -- continues --;

Column 15, line 26, "addition" should be -- diffusion --.

Signed and Sealed this

Ninth Day of September 1986

[SEAL]

Attest:

DONALD J. QUIGG

Attesting Officer

Commissioner of Patents and Trademarks